United States Patent [19]

Sawada et al.

[11] Patent Number: 4,515,881

[45] Date of Patent: May 7, 1985

[54] ELECTROPHOTOGRAPHIC BISAZO PHOTOSENSITIVE MEMBER

[75] Inventors: Kiyoshi Sawada; Satoshi Goto; Akira Kinoshita; Osamu Sasaki, all of Hino, Japan

[73] Assignee: Konishiroku Photo Industry Co., Ltd., Tokyo, Japan

[21] Appl. No.: 549,589

[22] Filed: Nov. 7, 1983

[51] Int. Cl.³ .................. G03G 5/06; G03G 5/14
[52] U.S. Cl. ........................ 430/58; 430/72; 430/76; 430/78; 430/79; 534/653
[58] Field of Search .............. 430/72, 76, 78, 79, 430/58

[56] References Cited

U.S. PATENT DOCUMENTS 4,359,513 11/1982 Katagiri et al. .............. 430/72 X
4,390,608 6/1983 Hashimoto et al. ........... 430/72 X

FOREIGN PATENT DOCUMENTS 2312049 12/1976 France ........................ 430/72

Primary Examiner—Roland E. Martin
Attorney, Agent, or Firm—Frishauf, Holtz, Goodman & Woodward

[57] ABSTRACT

An electrophotographic photosensitive member, comprising an electroconductive support and, provided thereon, a photosensitive layer containing a bisazo compound represented by the formula [I]:

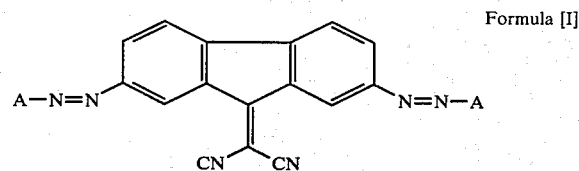

Formula [I]

wherein A is as per defined in the specification.

The electrophotographic photosensitive member according to the present invention is stable to heat and light and also excellent in carrier generating ability.

23 Claims, 6 Drawing Figures

ELECTROPHOTOGRAPHIC BISAZO PHOTOSENSITIVE MEMBER

BACKGROUND OF THE INVENTION

1. Field of the Invention

This invention relates to an electrophotographic photosensitive member, more particularly to a novel electrophotographic photosensitive member containing a bisazo compound.

2. Description of the Prior Art

In the electrophotographic photosensitive members of the prior art, those having inorganic photoconductive materials such as selenium, zinc oxide and cadmium oxide as the main component have widely been used. However, these were not necessarily sufficiently satisfactory in sensitivity, heat resistance or printing resistance.

On the other hand, in recent years, electrophotographic photosensitive members comprising photosensitive layers containing organic photoconductive compounds as the main component are attracting attention. These have a number of advantages of relatively easy preparation, low production cost, applicability for any desired shape such as cylindrical drum or sheet, easy handling, excellent heat resistance and others. However, for example, in an electrophotographic photosensitive member having a photosensitive layer composed mainly of a charge transfer complex formed from poly-N-vinylcarbazole and a Lewis acids such as 2,4,7-trinito-9-fluorenone or the like, which has already practically been used, the results obtained are not necessarily satisfactory with respect to sensitivity and printing resistance.

Meanwhile, since the invention of a function separation type electrophotographic photosensitive member of the layered type or the dispersed type, in which the carrier generating function and the carrier transporting function from the aspect of photoconductive function are divided to be possessed by separate materials, various advantages have been brought about. Such a function separation type electrophotographic photosensitive member has the advantages of attaining relatively easily high performances in electrophotographic characteristics such as charging characteristic, sensitivity, residual potential, etc. as well as in printing resistance and also of easy preparation of an electrophotographic photosensitive member having desired characteristics.

As the carrier generating material undertaking primarily the function of carrier generation in an electrophotographic photosensitive member having such advantages, various inorganic and organic materials have been proposed to be used. As an inorganic material, a carrier generating layer fromed from amorphous selenium is well known, but this has the drawback of being crystallized under high temperature conditions to be deteriorated in performance. On the other hand, as an organic material, materials selected from among photoconductive organic dyes or pigments have been variously proposed to be used, particularly for carrier-generating materials, as exemplified by azo compounds disclosed in U.S. Pat. No. 3,898,084, Japanese Provisional Patent Publication Nos. 95033/1978, 22834/1979, 79632/1979 and 116040/1981. However, these azo compounds are not necessarily satisfactory in such characteristics as sensitivity, residual potential or stability when repeatedly used. Also, the carrier transporting material must be selected from a limited range of materials, and, under the present situation, there is obtained no electrophotographic photosensitive member which can satisfy sufficiently the broad scope of requirements in electrophotographic process.

Further, in recent years, as the light source for a photosensitive member, a gas laser such as Ar laser, He-Ne laser and the like or a semiconductor laser is coming to be used. These lasers are capable of on/off in time series, can perform high resolving recording at high speed and also enable a diversity of recording modes. Therefore, they are expected to be very promising, particularly for copying machines having image treating functions, including intelligent copier, or printers for output of computers. Among them, a semiconductor laser is attracting attention, because, by virtue of its characteristics, it can dispense with an electrical signal/optical signal converting element such as an acousatic optical modulator, and also enables miniturization and weight reducton of the device. However, this semiconductor laser is lower in output as compared with a gas laser, and its oscillation wavelength is longer (about 780 nm or longer), and therefore it is impossible to use a semiconductor laser as the light source for a photosensitive member of the prior art, of which spectral sensitivity is shifted too much toward the shorter wavelength side.

OBJECTS OF THE INVENTION

An object of the present invention is to provide an electrophotographic photosensitive member containing a bisazo compound, which is stable to heat and light and also excellent in carrier generating ability.

Another object of the present invention is to provide an electrophotographic photosensitive member, having a high sensitivity and a small residual potential, which is excellent in durability with those characteristics being unchanged even after repeated uses.

Still another object of the present invention is to provide an electrophotographic photosensitive member containing a bisazo compound which can effectively act as the carrier generating substance even in combinations with a wide scope of carrier transporting substances.

Further, another object of the present invention is to provide a photosensitive member having a sufficiently practical sensitivity even to a light source with longer wavelength such as a semiconductor laser.

DETAILED DESCRIPTION OF THE INVENTION

Figure 1:
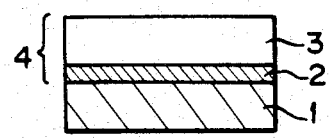

The present inventors have made extensive studies to achieve the above objects and consequently found that the bisazo compound represented by the formula [I] shown below can function as an effective component for the photosensitive member to accomplish the present invention:

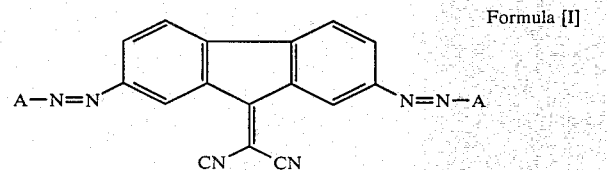

Formula [I]

In the above formula, A is selected from the following groups:

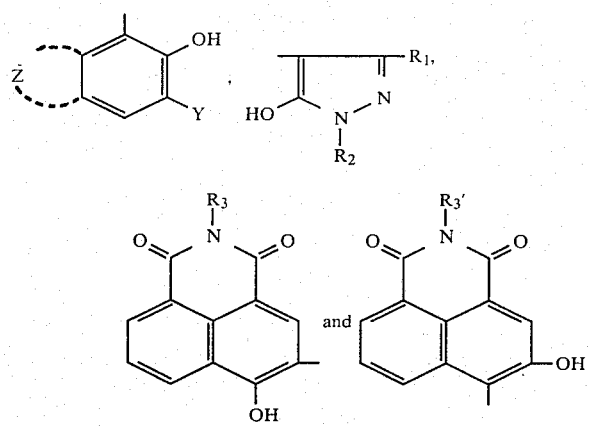

In the above groups, Y is a hydrogen atom, a hydroxy group, a carboxy group or its ester group, a sulfo group, a carbamoyl group or a sulfamoyl group, preferably a carbamoyl group

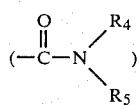

or a sulfamoyl group

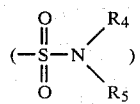

wherein $R_4$ represents a hydrogen atom, a lower alkyl group having 1 to 4 carbon atoms (e.g. methyl, ethyl, isopropyl, n-butyl, allyl), a lower alkenyl group (e.g. allyl, vinyl, butadienyl), a phenyl group, an aralkyl group (e.g. benzyl, phenetyl), preferably a hydrogen atom, a lower alkyl group having 1 to 4 carbon atoms (e.g. methyl, ethyl, isopropyl, n-butyl, allyl), more preferably a hydrogen atom, and $R_5$ represents a hydrogen atom, a lower alkyl group such as those mentioned for $R_4$, a lower alkenyl group such as those mentioned for $R_4$ an aralkyl group (such as those mentioned for $R_4$), an aromatic hydrocarbon ring (e.g. phenyl, naphthyl, anthryl) or an aromatic heterocyclic (e.g. carbazolyl, dibenzofuryl), preferably an aromatic hydrocarbon ring or an aromatic heterocyclic group, more preferably an aromatic hydrocarbon ring.

Z represents a group of atoms necessary for forming an aromatic hydrocarbon ring or an aromatic heterocyclic ring, typically a benzene ring, a naphthalene ring, an indole ring, an benzofuran ring, a carbazole ring and the like, to which, however, the present invention is not limited.

$R_1$ is a hydrogen atom, a lower alkyl group having 1 to 4 carbon atoms (such as those mentioned for $R_4$), a lower alkenyl group such as those mentioned for $R_4$, an amino group (e.g. amino, methylamino, anilino), a carboxy group or its ester group (e.g. ethoxycarbonyl, benzoylcarbonyl), a carbamoyl group (e.g. carbamoyl, N-methylcarbamoyl, N-phenylcarbamoyl) or a cyano group, preferably a hydrogen atom, a lower alkyl having 1 to 4 carbon atoms or a cyano group.

$R_2$ is an aromatic hydrocarbon group, preferably an aryl group, more preferably a phenyl group.

Each of $R_3$ and $R_3'$ is a lower alkyl group having 1 to 4 carbon atoms (such as those mentioned for $R_4$), a lower alkenyl group such as those mentioned for $R_4$, an aralkyl group (such as those mentioned for $R_4$) or an aromatic hydrocarbon ring (such as those mentioned for $R_5$), preferably a lower alkyl group having 1 to 4 carbon atoms or an aromatic hydrocarbon ring.

In the series of the groups or rings as mentioned above for these $R_1$, $R_2$, $R_3$, $R_3'$, $R_4$, $R_5$ and Z, there may be also included those having substituents thereon. Such substituents may include, for example, lower alkyl groups having 1 to 4 carbon atoms (such as those mentioned for $R^4$), a lower alkenyl group such as those mentioned for $R_4$, halogen atoms (chlorine, bromine, fluorine, iodine), lower alkoxy groups having 1 to 4 carbon atoms (e.g. methoxy, ethoxy, isopropoxy, sec-butoxy), a lower alkenyloxy such as vinyloxy, allyloxy, butadienyloxy, hydroxy group, aryloxy groups (e.g. phenoxy, naphthoxy), acyloxy groups (e.g. acetyloxy, benzoyloxy), carboxy group or its ester groups (e.g. ethoxycarbonyl, phenoxycarbonyl), carbamoyl groups (e.g. carbamoyl, N-methylcarbamoyl, N-phenylcarbamoyl), acyl groups (e.g. acetyl, benzoyl), sulfo group, sulfamoyl groups (e.g. sulfamoyl N-ethylsulfamoyl, N-naphthylsulfamoyl), amino groups (e.g. amino, dimethylamino, anilino), acylamino groups (e.g. acetylamino, benzoylamino), sulfonamide groups (e.g. methansulfonamide, benzenesulfonamide), cyano group, nitro group, an aromatic hydrocarbon group (e.g. phenyl, naphthyl), an aromatic heterocyclic group (e.g. oxazolyl, imidazolyl) and so on.

Preferable substituents are lower alkyl groups having 1 to 4 carbon atoms as exemplified above, halogen atoms as exemplified above, lower alkoxy groups having 1 to 4 carbon atoms as exemplified above, cyano group and nitro group.

The series of substituents as mentioned above may further be substituted with the series of substituents as set forth above.

More specifically, in the present invention, by use of the bisazo compound as the photoconductive substance constituting the photosensitive layer of the electrophotographic photosensitive member or by use of the bisazo compound of the present invention as the carrier generating material in a function separation type electrophotographic photosensitive member, in which genration and transportation of carrier are effected by separate materials, through utilization of only the excellent carrier generating ability of the bisazo compound of the present invention, it is possible to prepare an electrophotographic photosensitive member having characteristics which are fast and stable to heat and light, which is excellent in electrophotographic characteristics such as charging characteristic, sensitivity and residual potential and also has a sufficient sensitivity to a longer wavelength light source.

As the bisazo compounds useful in the present invention represented by the above formula [I], the exemplary compounds having the following structural formulas may be enumerated, but the bisazo compounds of the present invention are not limited thereto.

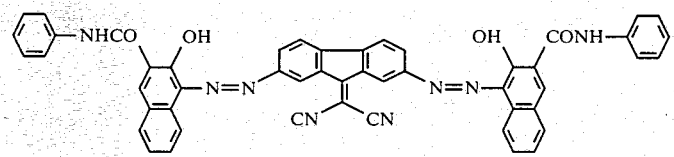 (I-1)
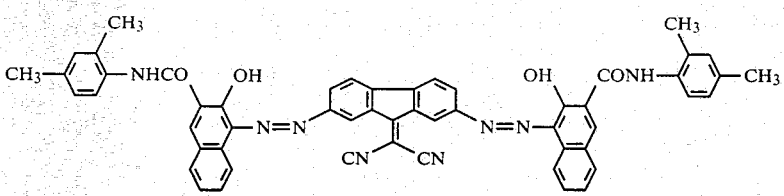 (I-2)
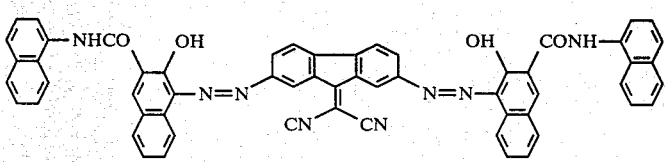 (I-3)
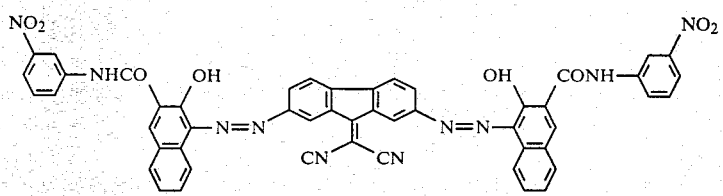 (I-4)
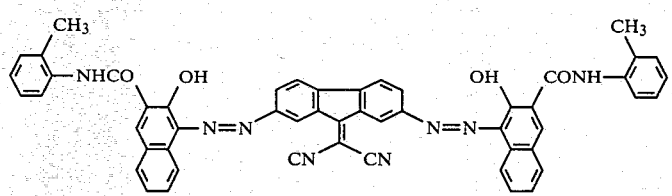 (I-5)
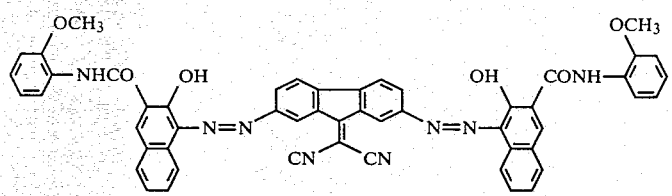 (I-6)
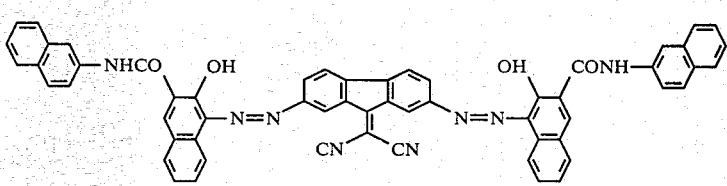 (I-7)
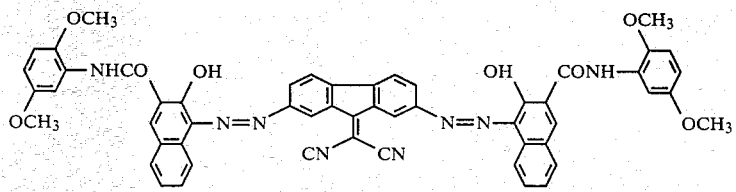 (I-8)

-continued
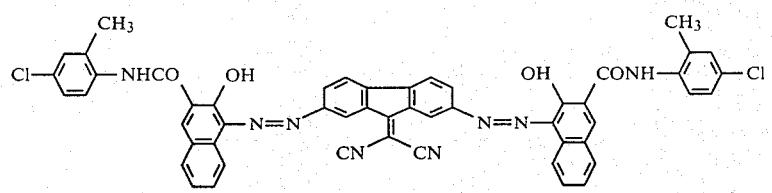
(I-9)
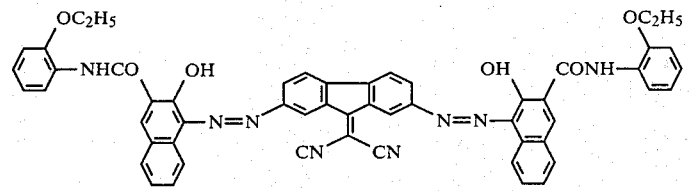
(I-10)
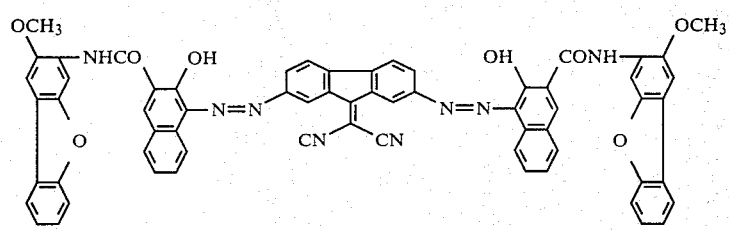
(I-11)
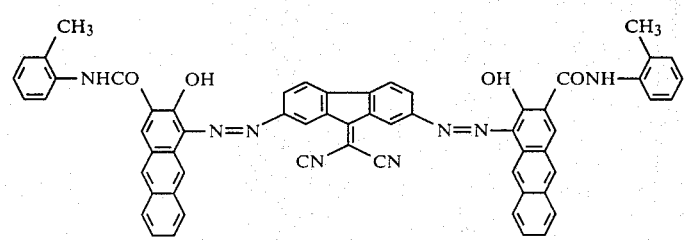
(I-12)
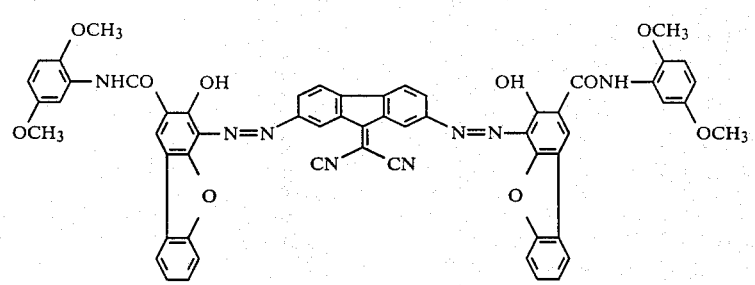
(I-13)
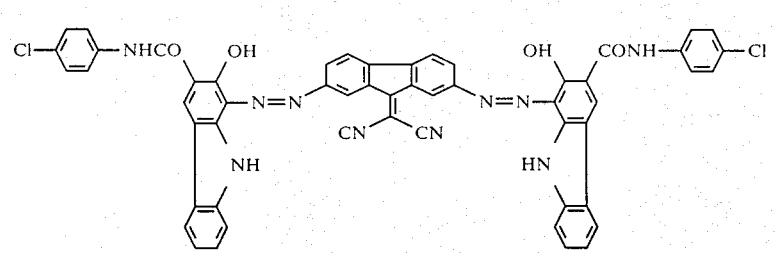
(I-14)

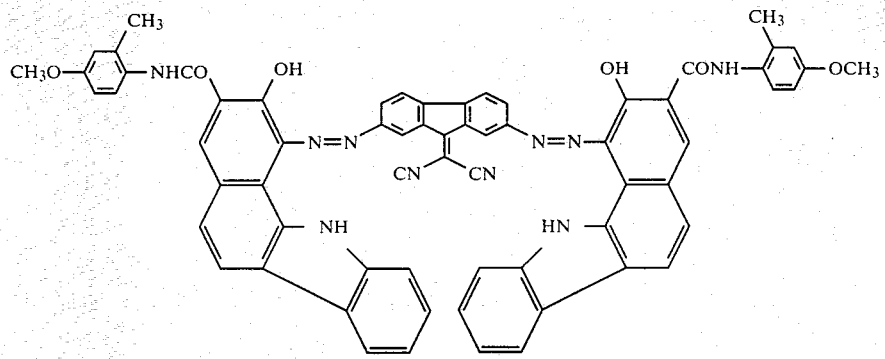
(I-15)
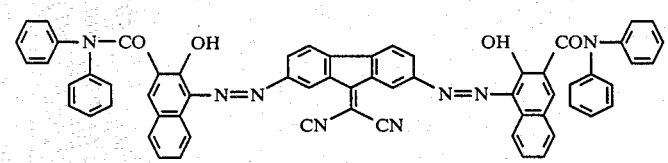
(I-16)
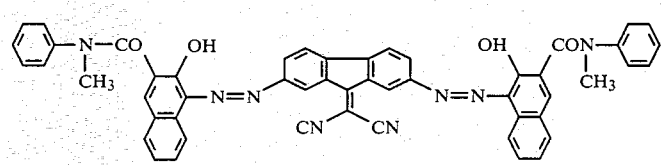
(I-17)
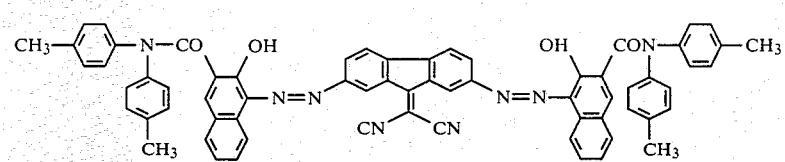
(I-18)
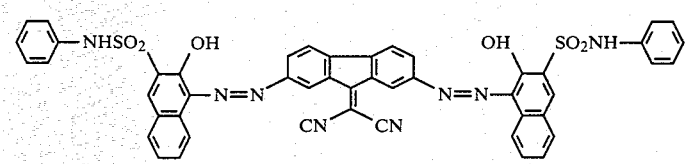
(I-19)
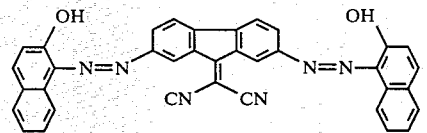
(I-20)
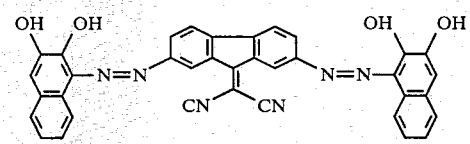
(I-21)
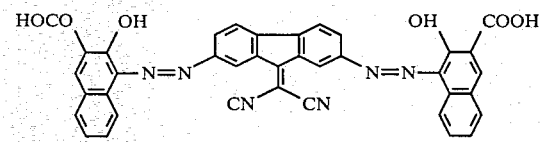
(I-22)
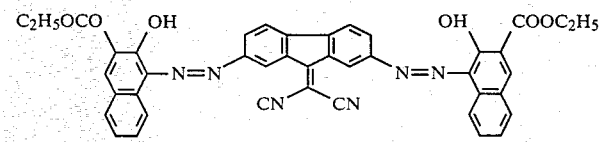
(I-23)

-continued
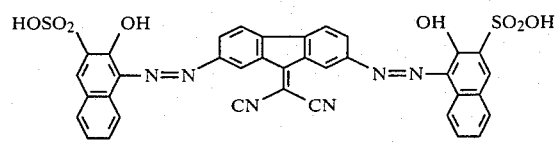 (I-24)
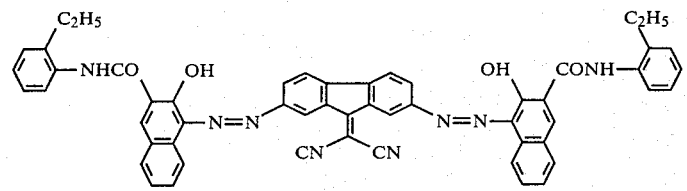 (I-25)
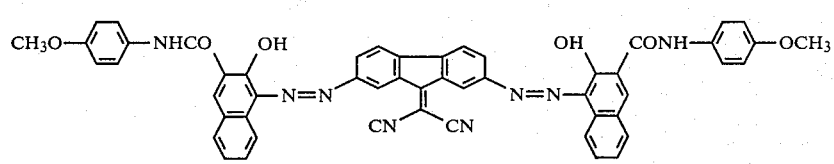 (I-26)
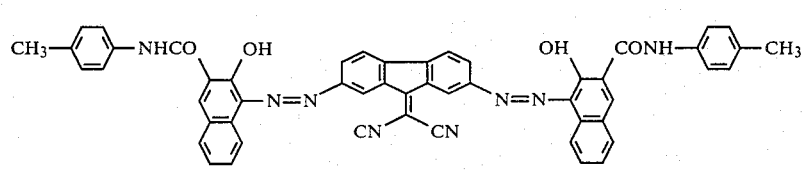 (I-27)
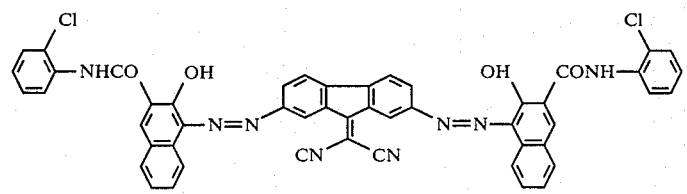 (I-28)
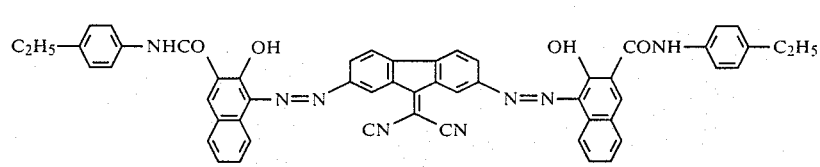 (I-29)
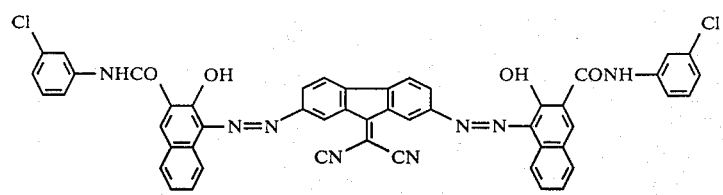 (I-30)
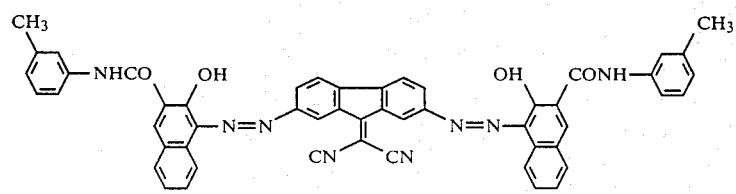 (I-31)
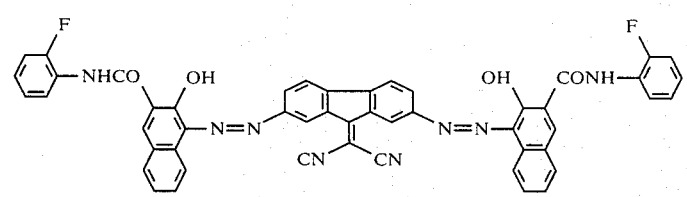 (I-32)

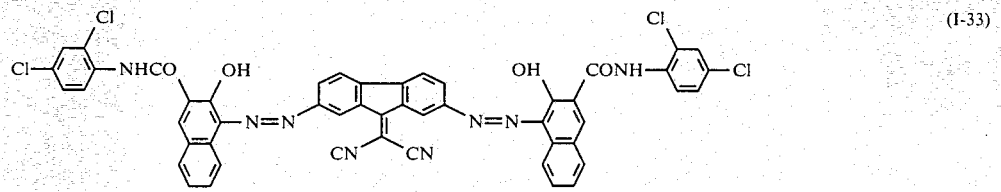
(I-33)
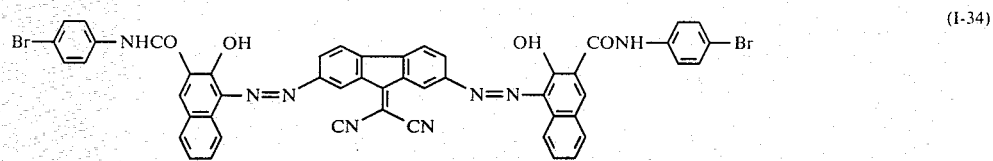
(I-34)
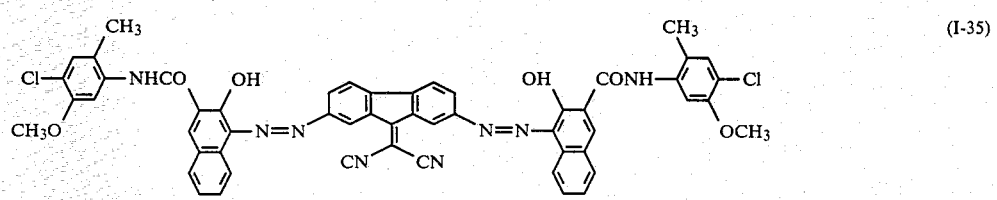
(I-35)
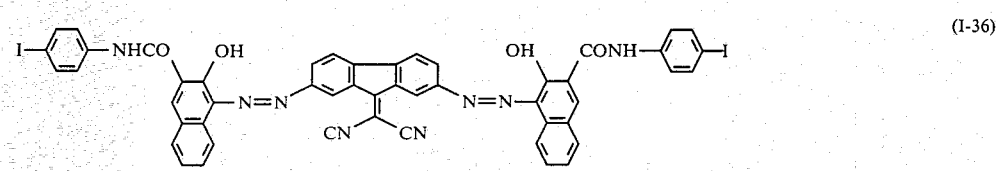
(I-36)
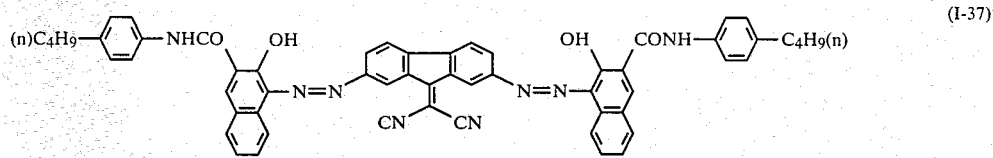
(I-37)
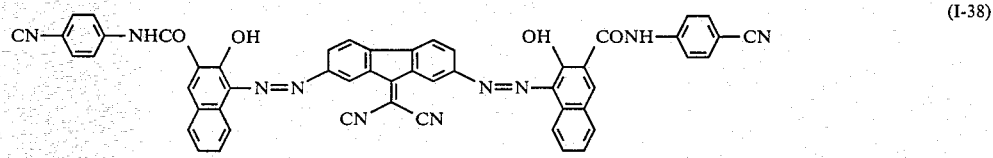
(I-38)
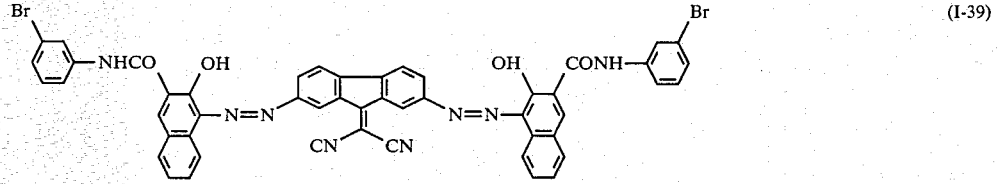
(I-39)
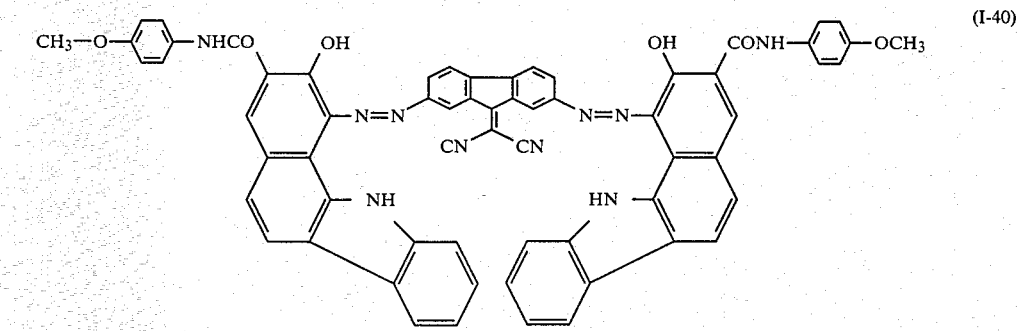
(I-40)

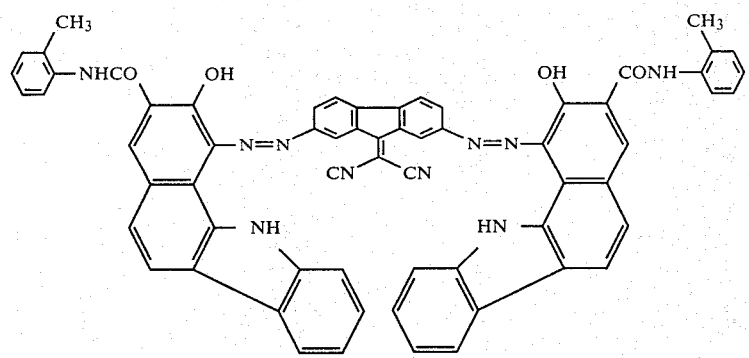
(I-41)
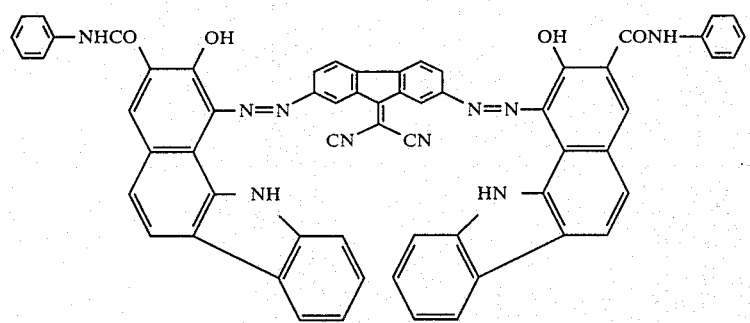
(I-42)
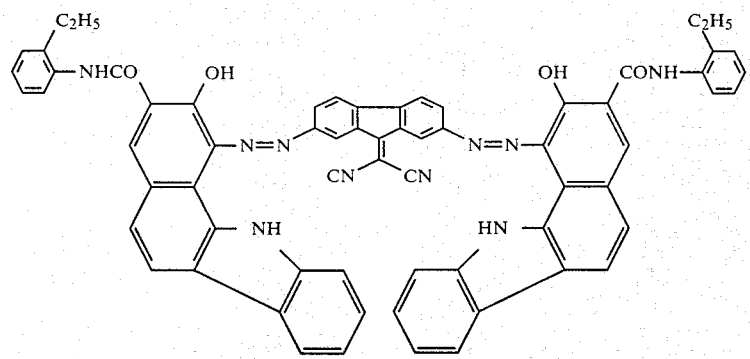
(I-43)
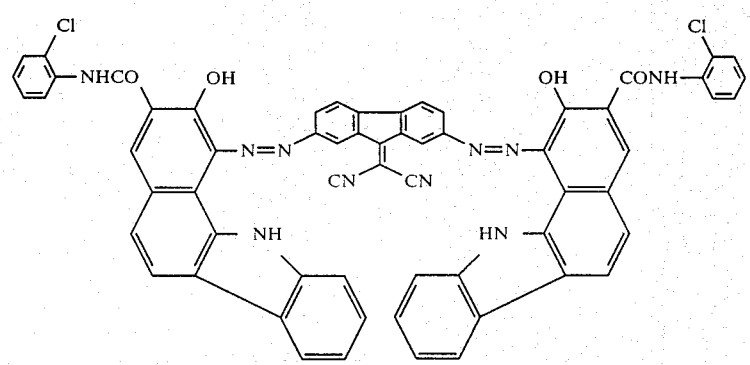
(I-44)

-continued
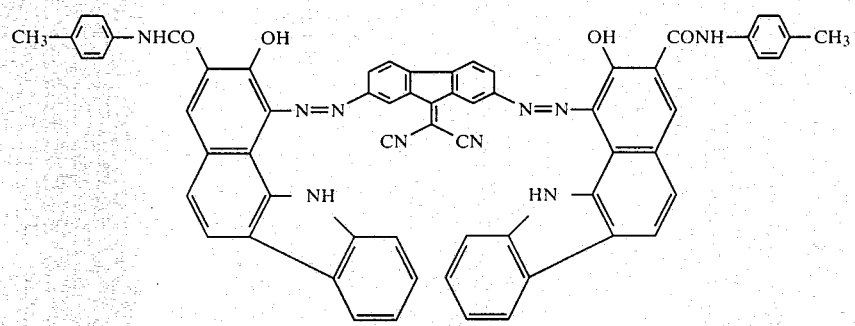
(I-45)
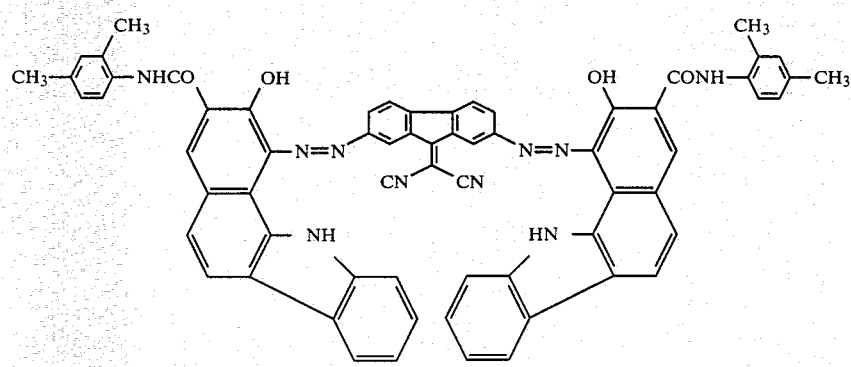
(I-46)
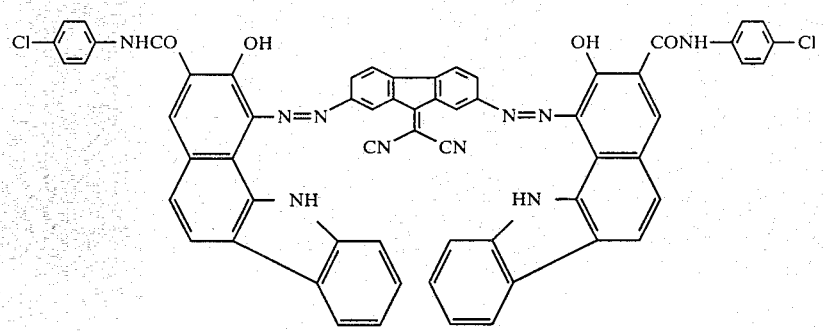
(I-47)
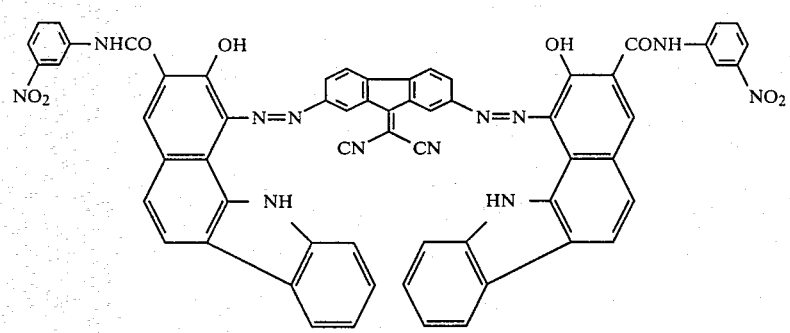
(I-48)
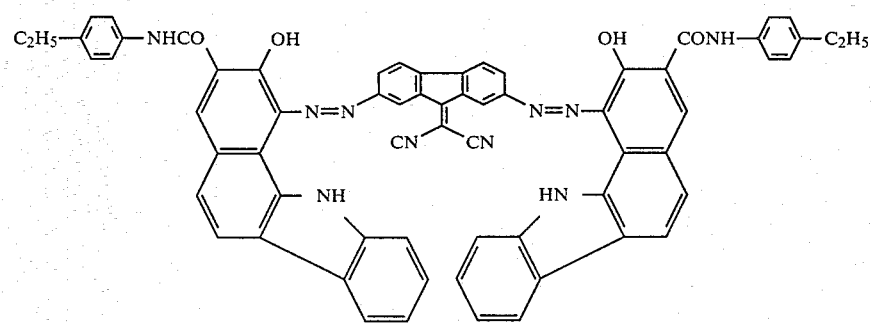
(I-49)

-continued
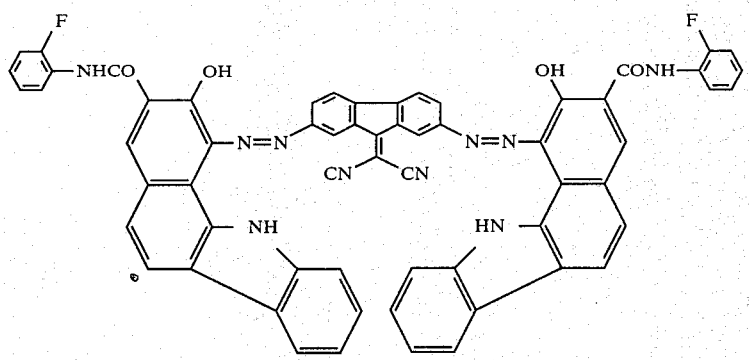
(I-50)
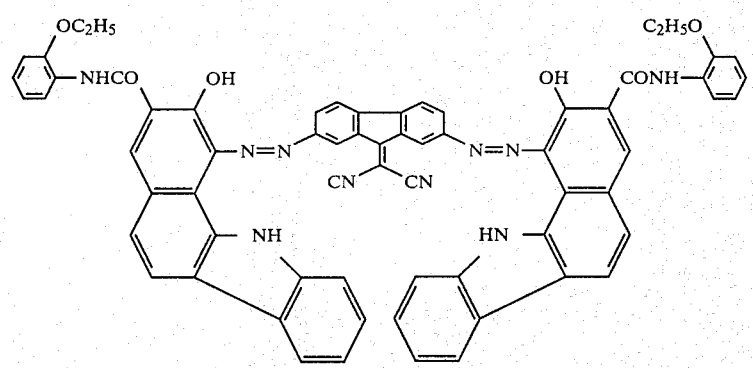
(I-51)
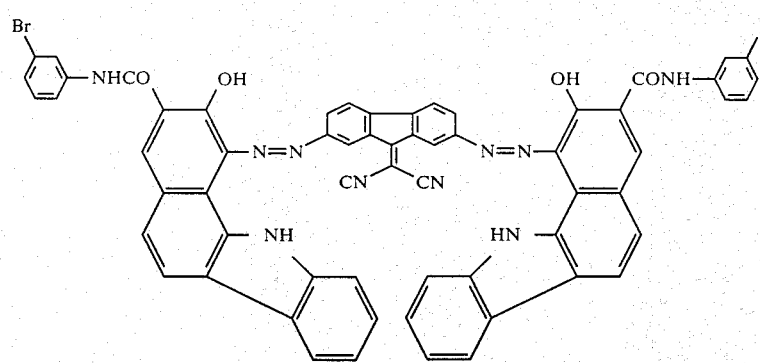
(I-52)
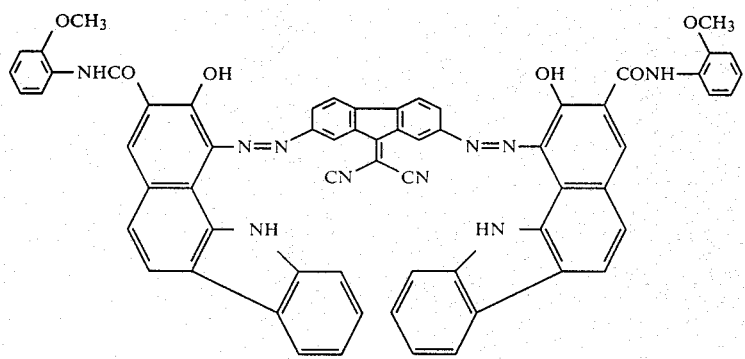
(I-53)

-continued
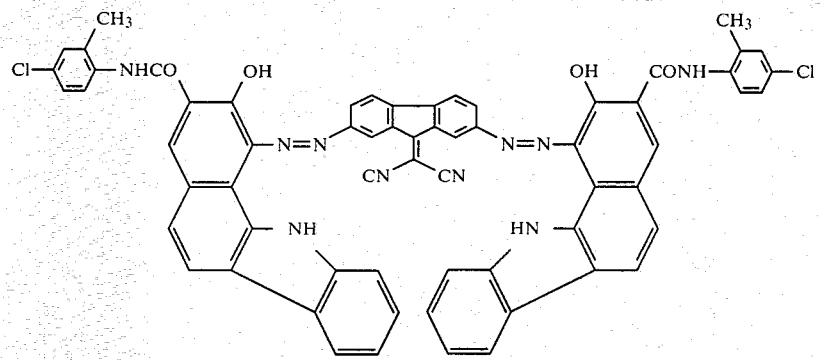 (I-54)
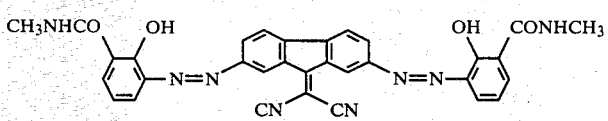 (I-55)
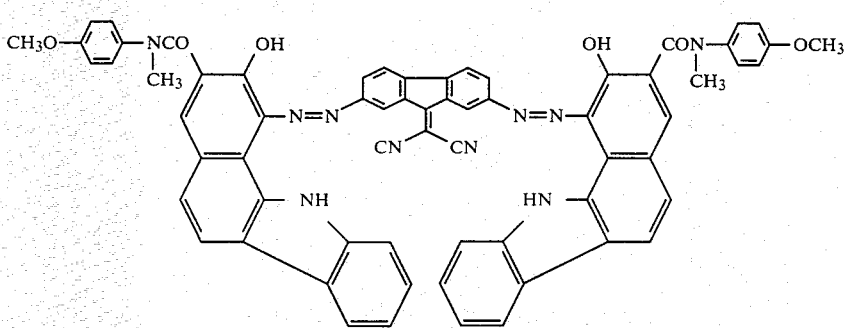 (I-56)
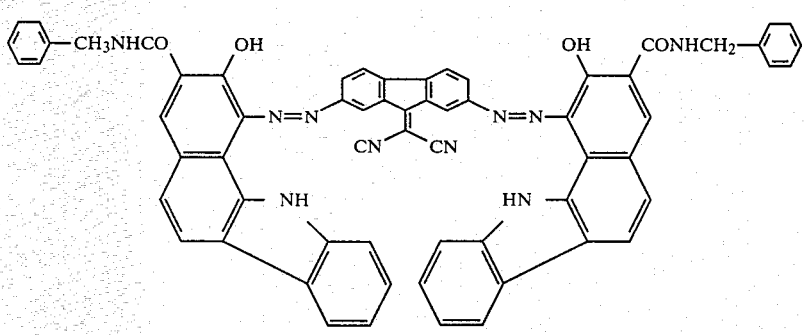 (I-57)
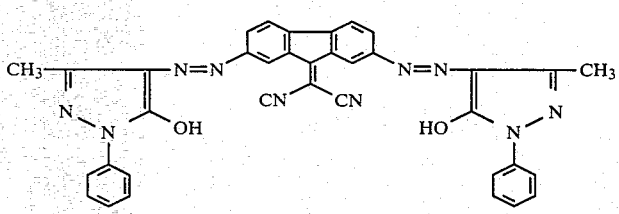 (I-58)
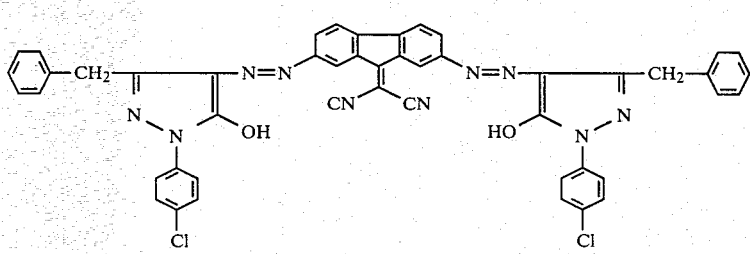 (I-59)

-continued
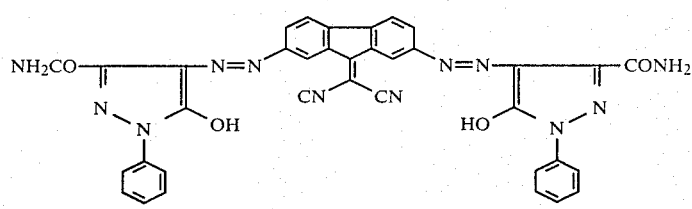
(I-60)
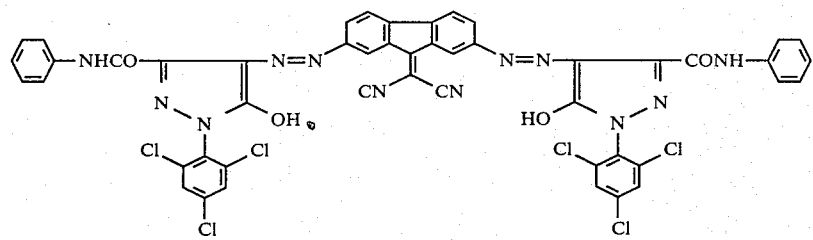
(I-61)
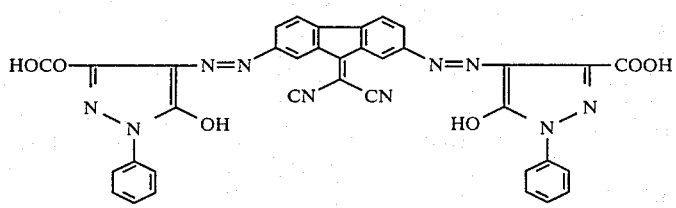
(I-62)
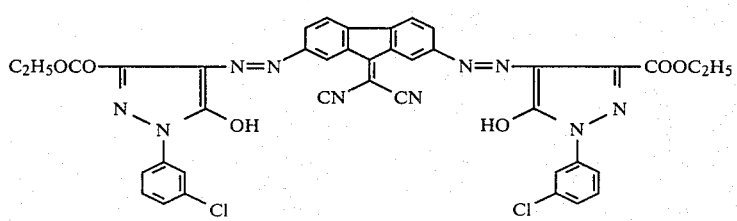
(I-63)
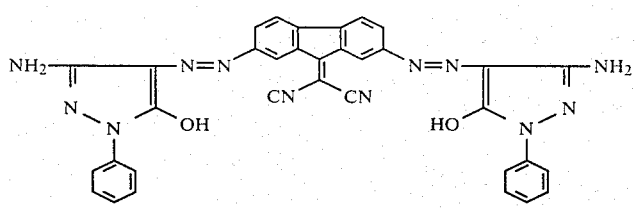
(I-64)
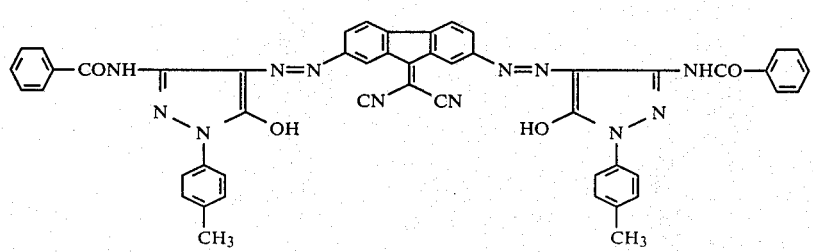
(I-65)
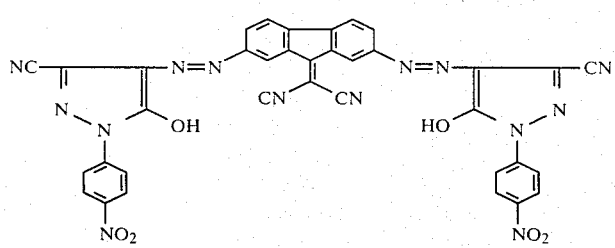
(I-66)

(I-67)
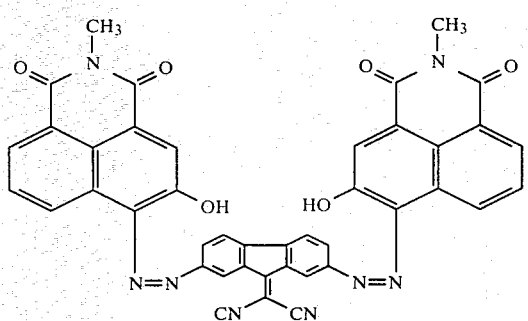
(I-68)
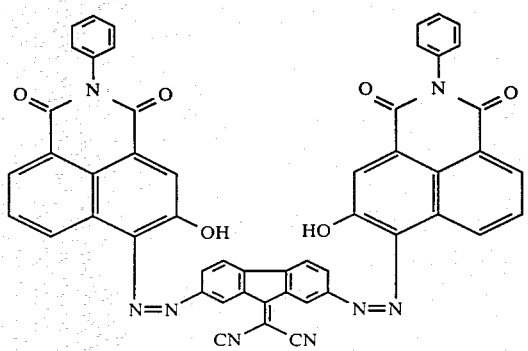
(I-69)
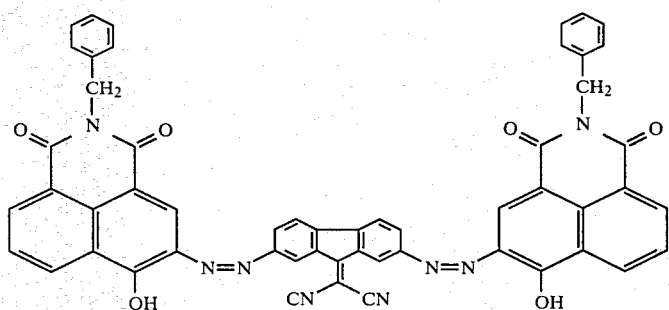
(I-70)
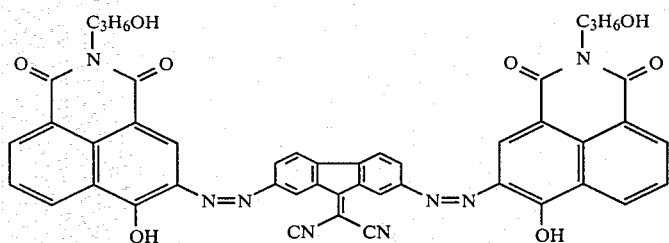
(I-71)
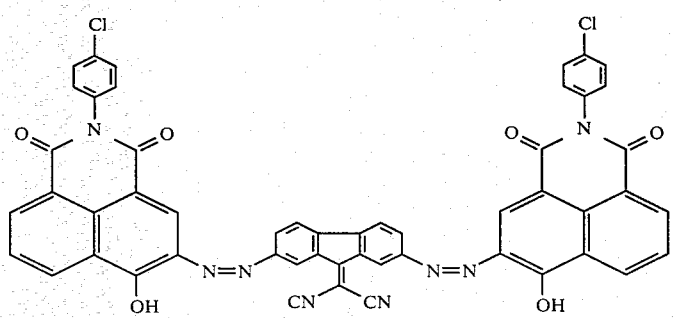

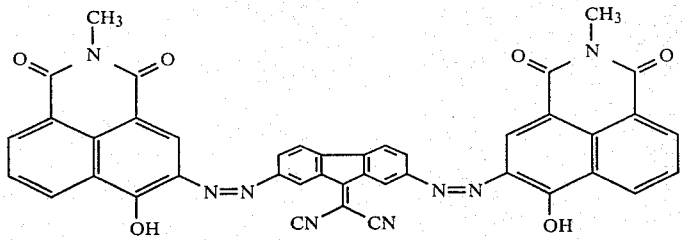 (I-72)

The bisazo compounds as described above can be synthesized according to, for example, the method as shown in the following synthesis example.

SYNTHESIS EXAMPLE

[Synthesis of the Exemplary Compound (I-1)]

When 2,7-dinitro-9-dicyanomethylidenefluorene, which is a compound obtained by dehydrating condensation of 2,7-dinitro-9-fluorenone and malonic acid nitrile according to the known method [see, for example, J. Org. Chem. Vol. 30, page 644, (published in 1965)], is reduced with tin and hydrochloric acid, 2,7-diamino-9-dicynomethylidenefluorene dihydrochloride is obtained. This product in an amount of 3.31 g (0.01 mole) was dispersed in 100 ml of hydrochloric acid, and the dispersion was cooled under stirring to a temperature of 5° C., and an aqueous solution having 1.4 g of sodium nitrite dissolved in 20 ml of water was added dropwise thereto. After completion of the dropwise addition, the mixture was further continued to be stirred under cooling for one hour, followed by filtration. To the filtrate obtained was added 10 g of ammonium hexafluorophosphate, and the crystals formed were collected by filtration to obtain hexafluorophosphate of tetrazonium. The crystals were dissolved in 200 ml of N,N-dimethylformamide to obtain a solution to be added dropwise in the subsequent coupling reaction.

To a solution of 5.27 g (0.02 mole) of 2-hydroxynaphthoic acid anilide dissolved in 200 ml of N,N-dimethylformamide was added 5.5 g of triethanolamine, and while stirring vigorously the resultant solution under cooling at a temperature of 5° C., the solution for dropwise addition as already described was added dropwise thereto. After the dropwise addition was over, stirring as continued for additional one hour under cooling, followed further by stirring at room temperature for 2 hours, and the crystals formed were collected by filtration. The crystals were washed twice with 1 liter of N,N-dimethylformamide and twice with 1 liter of acetone, followed by drying, to give 6.70 g (Yield 83.0%) of a blue compound.

The blue compound was confirmed to be the desired exemplary compound (I-1) from the fact that absorption by the C=O bonding of amide was observed at $\nu = 1680$ cm$^{-1}$ and also that the values of elemental analysis measured coincided highly with theoretical values.

Elemental analysis: Calcd. (for $C_{50}H_{30}N_8O_4$): C, 74.61; H, 3.70; N, 13.67. Found: C, 74.43; H, 3.74; N, 13.89.

For constituting the photosensitive layer of the electrophotographic photosensitive member with the use of the bisazo compound represented by the above formula [I], a layer having the bisazo compound dispersed in a binder may be provided on an electroconductive support. Alternatively, the bisazo compound may be used as the carrier generating material and combined with a carrier transporting material having carrier transporting ability to provide a so called function separation type photosensitive layer of the layered type or the dispersed type. In the constitution of the photosensitive layer, the bisazo compound represented by the above formula [I] may be used not only as a single species, but also as a combination of two or more species or a combination with other carrier generating materials such as other bisazo compounds.

Figure 2:
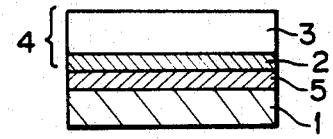
Figure 3:
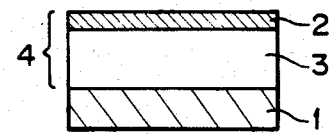
Figure 4:
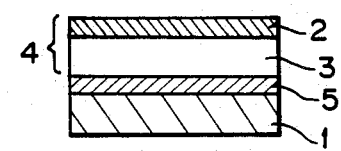
Figure 5:
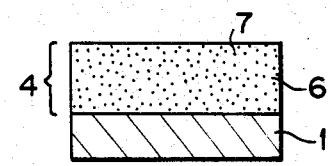
Figure 6:
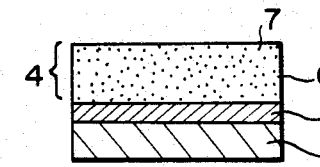

The mechanical constitution in the case of making the electrophotographic photosensitive member of the present invention of the function separation type may be any of those known in the prior art. Generally, the constitutions as shown in FIGS. 1 through 6 can be used. According to the constitutions as shown in FIG. 1 and FIG. 3, on an electroconductive support 1, there is provided a photosnsitive layer 4 comprising a carrier generating layer 2 composed principally of the bisazo compound as described above and a carrier transporting layer 3 composed principally of a carrier transporting substance. According to the constitutions as shown in FIG. 2 and FIG. 4, an intermediate layer 5 is interposed between the electroconductive support 1 and the photosensitive layer 4 in the constitutions as shown in FIG. 1 and FIG. 3, respectively. The most excellent electrophotographic characteristics can be obtained when the photosensitive layer is constituted as such double layers. The constitution as shown in FIG. 5 has a photosensitive layer 4 comprising a carrier generating material of the above bisazo compound dispersed in a layer 6 containing a carrier transporting material as the principal component provided directly on the electroconductive support 1. The constitution shown in FIG. 6 has the same photosensitive layer 4 as shown in FIG. 5 provided through an intermediate layer 5 on the electroconductive support 1.

As the carrier transporting material, there may be included, for example, electron accepting materials capable of transporting electrons such as trinitrofluorenone, tetranitrofluorenone and the like; polymers having heterocyclic compounds as the side chain, typically poly-N-vinylcarbazole; electron donating materials capable of transporting positive holes such as triazole derivatives, oxadiazole derivatives, imidazole derivatives, pyrazoline derivatives, polyarylalkane derivatives, phenylenediamine derivatives, hydrazone derivatives, amino-substituted chalcone derivatives, triarylamine derivatives, carbazole derivatives, stilbene derivatives and others.

But the carrier transporting material to be used in the present invention is not limited to these.

The carrier generating layer 2 in the case of forming a photosensitive layer of double layer constitution may be provided according to the following methods:

(a) the method in which a solution of the bisazo compound as already described above dissolved in an appropriate solvent or a solution having added thereto a binder to be mixed and dissolved therein is applied by way of coating;

(b) the method in which the bisazo compound as already described above is attrited in a dispersant into fine particles by means of a ball mill or a homo-mixer, followed optionally by addition of a binder, and the dispersion obtained by mixing and dispersing of these materials is applied by way of coating.

As the solvent or dispersant to be used in forming the carrier generating layer, there may be included n-butylamine, diethylamine, ethylenediamine, iso-propanolamine, triethanolamine, triethylenediamine, N,N-dimethylformamide, acetone, methyl ethyl ketone, cyclohexanone, benzene, toluene, xylene, chloroform, 1,2-dichloroethane, dichloromethane, tetrahydrofuran, dioxane, methanol, ethanol, isopropanol, ethyl acetate, butyl acetate, dimethyl sulfoxide, etc.

When a binder is to be employed in formation of a carrier generating layer or a carrier transporting layer, it is possible to use any desired material as said binder, particularly a film forming polymer which is hydrophobic, high in dielectric constant and electrically insulating. As such polymers, there may be included the following polymers, to which the present invention is not of course limited.

(a) Polycarbonate
(b) Polyester
(c) Methacrylic resin
(d) Acrylic resin
(e) Polyvinyl chloride
(f) Polyvinylidene chloride
(g) Polystyrene
(h) Polyvinyl acetate
(i) Styrene-butadiene copolymer
(j) Vinylidene chloride-acrylonitrile copolymer
(k) Vinyl chloride-acrylonitrile copolymer
(l) Vinyl chloride-vinyl acetate-maleic anhydride copolymer
(m) Silicone resin
(n) Silicone-alkyd resin
(o) Phenol-formaldehyde resin
(p) Styrene-alkyd resin
(q) Poly-N-vinylcarbazole.

These binders may be used either individually or as a mixture of two or more kinds.

The carrier generating layer 2 thus formed may have a thickness preferably of 0.01 to 20 μm, more preferably 0.05 to 5 μm.

As the electroconductive support in the present invention, there may be employed a metal plate, a metal drum or a composite having an electroconductive thin layer comprising an electroconductive polymer, an electroconductive compound such as indium oxide or a metal such as aluminum, palladium, gold, etc. provided on a substrate by such means as coating, vapor deposition or lamination on a substrate such as paper, plastic film and others. As the intermediate layer which functions as the adhesive layer or the barrier layer, it is possible to use a layer consisting of a material, for example, organic polymeric substances, including polymers as described for the binder, polyvinyl alcohol, ethyl cellulose, carboxymethyl cellulose and the like, or aluminum oxide.

The electrophotographic photosensitive member of the present invention has the constitution as described above, and by employing the bisazo compound represented by the above formula [I] as the photoconductive substance constituting the photoconductive layer in an electrophotographic photosensitive member or, while utilizing only the excellent carrier generating ability of the bisazo compound of the present invention, employing the bisazo compound as carrier generating material in a function separation type electrophotographic photosensitive member in which generation and transportation of carriers are effected by separate substances, it is possible to prepare an electrophotographic photosensitive member, exhibiting characteristics which are fast and stable to heat and light, and having excellent coated film properties, excellent electrophotographic characteristics such as charging characteristic, sensitivity, residual potential, etc. and excellent printing resistance without fatigue deterioration even when provided for repeated uses.

Moreover, the electrophotogrphic photosensitive member of the present invention has good sensitivity to the light with longer wavelength ($\approx 780$ nm), and it can be used widely, not only for conventional copying machines, but also as a photosensitive member having sufficiently good sensitivity even to a longer wavlength light source such as semiconductor laser for electrophotography such as laser printer, laser facscimile, etc.

The present invention is now described by referring to the following Examples, by which the present invention is not limited.

EXAMPLE 1

On an electroconductive support of a polyester film having an aluminum foil laminated thereon, an intermediate layer comprising a vinyl chloride-vinyl acetate-maleic anhydride copolymer "S-Lec MF-10" (produced by Sekisui Kagaku Kogyo Co.) with a thickness of 0.05 μm was provided. The bisazo compound (2 g) as shown by the exemplary compound (I-1) and 2 g of a polycarbonate resin "Panlite L 1250" (produced by Teijin Kasei Co.) were added to 100 ml of 1,2-dichloroethane and dispersed in a ball mill for 12 hours and the resultant dispersion was applied by means of a doctor blade on the above intermediate layer to a film thickness after drying of 0.5 μm, followed by drying, to form a carrier generating layer. Further, a solution having 6 g of a carrier transportng substance 3-(p-methoxystyryl)-9-(p-methoxy-phenyl)carbazole and 10 g of a polycarbonate resin "Panlite L-1250" dissolved in 100 ml of 1,2-dichloroethane was applied and dried to a film thickness after drying of 12 μm, thereby forming a carrier transporting layer to prepare an electrophotographic photosensitive member of the present invention.

The electrophotographic photosensitive member thus obtained was mounted on an electrostatic paper testing machine "Model SP-428" and the following characteristic tests were conducted. That is, a voltage of $-6$ kV was applied on the charger and the photosensitive layer was charged by corona discharging for 5 seconds and left to stand for 5 seconds. Then, a light from a halogen lamp was irradiated so that the illuminance on the surface of the photosensitive layer may be 35 lux, and dosage of exposure to decay the surface potential on the photosensitive layer to $\frac{1}{2}$, namely the half-value dosage $E_{\frac{1}{2}}$, was determined. Also, the surface potential after exposure at the dosage of 30 lux.sec, namely the residual potential $V_R$ was determined. Further, similar measurements were conducted by repeating 100 times. The results are as shown in Table 1.

TABLE 1

|  | First measurement | 100 th measurement |
|---|---|---|
| $E_{\frac{1}{2}}$ (lux · sec) | 2.1 | 2.1 |
| $V_R$ (V) | 0 | 0 |

COMPARATIVE EXAMPLE 1

An electrophotographic photosensitive member for comparative purpose was prepared according to the same procedure as in Example 1 except for using a bisazo compound represented by the formula shown below as the carrier generating substance, and the characteristics tests were conducted similarly as in Example 1. The results are shown in Table 2.

TABLE 2

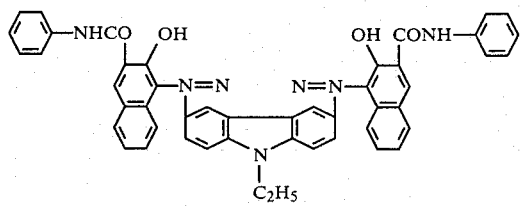

|  | First measurement | 100th measurement |
|---|---|---|
| $E_{\frac{1}{2}}$ (lux · sec) | 11.9 | 14.7 |
| $V_R$ (V) | −30 | −170 |

EXAMPLES 2-4

Example 1 was repeated except for using the respective exemplarly compounds (I-2), (I-3) and (I-7) to prepare three kinds as the total of the electrophotographic photosensitive members of the present invention, and the characteristics tests were conducted similarly for each member. The results are as shown in Table 3.

TABLE 3

| Example No. | Bisazo compound | First measurement | | 100 th measurement | |
|---|---|---|---|---|---|
| | | $E_{\frac{1}{2}}$ (lux · sec) | $V_R$ (V) | $E_{\frac{1}{2}}$ (lux · sec) | $V_R$ (V) |
| 2 | Exemplary compound I - 2 | 2.0 | 0 | 2.1 | 0 |
| 3 | Exemplary compound I - 3 | 2.2 | 0 | 2.2 | 0 |
| 4 | Exemplary compound I - 7 | 2.0 | 0 | 2.0 | 0 |

EXAMPLE 5

On an electroconductive support of a polyester film having an aluminum foil laminated thereon, an intermediate layer comprising a vinyl chloride-vinyl acetate-maleic anhydride copolymer "S-Lec MF-10" (produced by Sekisui Kagaku Kogyo Co.) with a thickness of 0.05 μm was provided. A dispersion obtained by dispersing 2 g of the exemplary compound (I-25) in 110 ml of 1,2-dichloroethane in a ball mill was applied and dried on the above intermediate layer to a film thickness after drying of 0.5 μm to form a carrier generating layer. Further, a solution having 6 g of a carrier transporting substance tri-p-tolylamine together with 10 g of a methacrylilc resin "Acrypet" (produced by Mitsubishi Rayon Co.) dissolved in 70 ml of 1,2-dichloroethane was applied and dried to a film thickness after drying of 10 μm, thereby forming a carrier transporting layer, to prepare an electrophotographic photosensitive member of the present invention.

For this electrophotographic photosensitive member, the same characteristic tests as in Example 1 were conducted. As the result, in the first measurement, $E_{\frac{1}{2}} = 3.0$ lux·sec and $V_R = -5$ V.

EXAMPLE 6

On the electroconductive support having the same intermediate layer provided thereon as used in Example 2, a 1% ethylenediamine solution of the exemplary compound (I-4) was applied on said intermediate layer and dried to a film thickness after drying of 0.3 μm to form a carrier generating layer. Further, 6 g of 1-phenyl-3-(p-diethylaminostyryl)-5-(p-diethylaminophenyl)-pyrazoline together with 10 g of a polyester resin "Byron 200" (produced by Toyo Boseki Co.) were disolved in 70 ml of 1,2-dichloroethane, and the resultant solution was applied and dried to a film thickness of 12 μm after drying, thereby forming a carrier transporting layer, to prepare an electrophotographic photosensitive member of the present invention.

The same characteristic tests as in Example 1 were conducted for this electrophotographic photosensitive member. The results are shown in Table 4.

COMPARATIVE EXAMPLE 2

An electrophotographic photosensitive member for comparative purpose was prepared according to the same procedure as in Example 6 except for using a bisazo compound represented by the formula shown below, and the characteristics were conducted similarly. The results are shown in Table 4.

TABLE 4

|  | First measurement | | 100th measurement | |
|---|---|---|---|---|
| | $E_{\frac{1}{2}}$ (lux · sec) | $V_R$ (V) | $E_{\frac{1}{2}}$ (lux · sec) | $V_R$ (V) |
| Example 6 | 2.9 | 0 | 3.0 | −5 |
| Comparative example 2 | 8.9 | −20 | 12.2 | −70 |

EXAMPLE 7

A carrier generating layer was formed in the same manner as in Example 5 except for using the exemplary compound (I-39) in place of the exemplary compound (I-25), and further a carrier transporting layer was formed by applying and drying a solution of 6 g of 1,1-bis(p-N,N-dibenzylaminophenyl)butane and 10 g of a polycarbonate resin "Panlite L-1250" in 70 ml of 1,2-dichloroethane to a film thickness after drying of 10 μm, to prepare an electrophotographic photosensitive member of the present invention.

When this electrophotogaphic photosensitive member were subjected to the same characteristic tests as in Example 1, the results were $E_{\frac{1}{2}} = 3.0$ lux·sec. and $V_R = 0$ V.

EXAMPLE 8

On the surface of an aluminum drum of 100 mm in diameter was formed an intermediate layer with a thickness of 0.05 μm comprising a vinyl chloride-vinyl acetate-maleic anhydride copolymer "S-Lec MF-10" (produced by Sekisui Kagaku Co.), and a carrier generating layer was formed on the above intermediate layer by applying and drying a dispersion prepared by dispersing 4 g of the exemplary compound (I-5) in 400 ml of 1,2-dichloroethane in a ball mill to a film thickness after drying of 0.6 μm.

On the carrier generating layer, a carrier transporting layer was formed by applying and drying a solution of 30 g of a carrier transporting substance N,N-diethylaminobenzaldehyde-1,1-diphenylhydrazone represented by the structural formula:

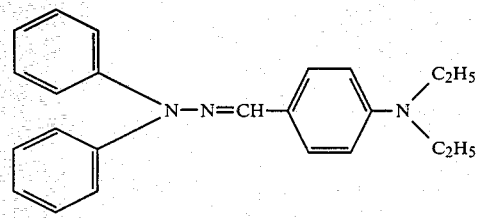

and 50 g of a polycarbonate resin "Yupilon S-1000" (produced by Mitsubishi Gas Kagaku Co.) in 400 ml of 1,2-dichloroethane to a film thickness after drying of 13 μm to prepare a drum type electrophotogaphic photosensitive member according to the present invention.

When this electrophotographic photosensitive member was mounted on a modified machine of the electrophotographic copying machine "U-Bix V2" (produced by Konishiroku Photo Industry Co.) and copied images were formed, copied images obtined were high in contrast, faithful to the original and clear. When copying was repeated for 20,000 times, the copied images obained were as good as the first copy to the last.

COMPARATIVE EXAMPLE 3

Example 8 was repeated except that a bisazo compound represented by the following structural formula was used as the carrier generating substance to prepare a drum type electrophotographic photosensitive member for comparative purpose.

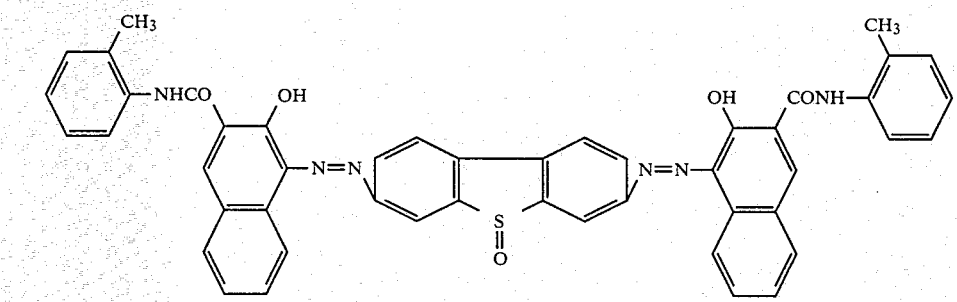

When copying test was conducted similarly as in Example 8 by use of this electrophotographic photosensitive member, the copied images were much in fog with low image densities. Also, when copying was repeated over 2000 times, the contrast of the copied image was gradually lowered, until substantially no image was formed in the last copying.

EXAMPLE 9

On an electroconductive support of a polyester film having an aluminum foil laminated thereon, an intermediate layer comprising a vinyl chloride-vinyl acetate-maleic anhydride copolymer "S-Lec MF-10" (produced by Sekisui Kagaku Kogyo Co.) with a thickness of 0.05 μm was provided. The bisazo compound (5 g) as shown by the exemplary compound (I-11) and 3.3 g of a polycarbonate resin "Panlite L 1250" (produced by Teijin Kasei Co.) were dispersed in 100 ml of 1,2-dichloroethane in a ball mill for 12 hours and the resultant dispersion was applied on the above intermediate layer to a film thickness after drying of 10 μm, followed by drying, to form an electrophotographic photosensitive member of the present invention.

For this electrophotographic photosensitive member, the characteristic tests were conducted in the same manner as in Example 1 except for changing the voltage applied to the charger to +6 kV, whereby the results were found to be $E_{\frac{1}{2}}=4.0$ lux·sec., $V_R=+15$ V.

EXAMPLE 10

On an electroconductive support comprising a polyester film having aluminum provided by vapor deposition thereon, a carrier transporting layer was formed by applying and drying a solution of 6 g of a carrier tansporting substance 1-phenyl-3-(p-diethylaminostyryl)-5-(p-diethylaminophenyl)pyrazoline and 10 g of a polyester resin "Byron 200" in 70 ml of 1,2-dichloroethane to a film thickness after drying of 10 μm, and further a carrier generating layer was formed on the carrier transporting layer by applying a dispersion of 1 g of the exemplary compound (I-3) and 1 g of the examplary compound (I-7) dispersed in 110 ml of 1,2-dichloroethane in a ball mill for 24 hours, to prepare an electrophotographic photosensitive member of the present invention.

For this electrophotographic photosensitive member, the characteristic tests were conducted in the same manner as in Example 9, whereby the results were found to be $E_{\frac{1}{2}}=3.6$ lux·sec., $V_R=+5$ V.

As apparently seen from the above results, the electrophotographic photosensitive member of the present invention is excellent in characteristics such as sensitivity, residual potential, etc. as well as in durability and stability during repeated uses.

EXAMPLE 11

On the surface of an aluminum drum of 100 mm in diameter was formed an intermediate layer with a thickness of 0.05 μm comprising a vinyl chloride-vinyl acetate-maleic anhydride copolymer "S-Lec MF-10" (produced by Sekisui Kagaku Co.), and a carrier generating layer was formed on the above intermediate layer by applying and drying a dispersion prepared by dispersing 4 g of the exemplary compound (I-15) in 400 ml of 1,2-dichloroethane in a ball mill to a film thickness after drying of 0.5 μm.

On the carrier generating layer, a carrier transporting layer was further formed by applying and drying a solution of 30 g of 3-(p-methoxystyryl)-9-(p-methoxyphenyl)carbazole and 50 g of a polycarbonate resin "Panlite L-1250" (produced by Teijin Kasei Co.) in 400 ml of 1,2-dichloroethane to a film thickness after drying of 12 μm to prepare a drum type electrophotogaphic photosensitive member according to the present invention.

The electrophotographic photosensitive member had a spectral sensitivity at 790 nm of 0.60 μJ/cm² (half-value exposure dosage).

Then, by means of an experimental machine equipped with a semiconductor laser (790 nm) capable of giving a laser light intensity of 0.85 mW on the surface of a photosensitive member, copying test was conducted.

When the surface of the photosensitive member was charged to -6 kV, exposed to laser and subjected to reversal development by the bias voltage, good images without fog could be obtained.

This result was not changed at all even after copying was repeated for 10,000 times.

EXAMPLES 12 TO 16

Example 11 was repeated except that the exemplary compounds (I-40), (I-43), (I-45), (I-51) and (I-54) were employed, respectively, in place of the exemplary compound (I-15) to obtain drum-shaped photosensitive members.

For each photosensitive member, spectral sensitivity at 790 nm was measured to obtain the result as shown in Table 5.

TABLE 5

| Carrier generating substance (exemplary compound): | I-40 | I-43 | I-45 | I-51 | I-54 |
|---|---|---|---|---|---|
| Half-value exposure dosage (μJ/cm²) | 0.61 | 0.56 | 0.60 | 0.75 | 0.72 |

Then, the copying test by means of the experimental device as described in Example 11 was conducted for each photosensitive member, whereby good images withoug fog were given by these photosensitive members, and these results were not changed even after repetition for 10,000 times.

As apparently seen from the results set forth above, the photosensitive member of the present invention is excellent in characteristics such as sensitivity, residual potential, etc. as well as in characteristics during repeated uses.

Further, it is also an excellent photosensitive member which is practically satisfactory in sensitivity to longer wavelength and stability during repeated uses.

We claim:

1. An electrophotographic photosensitive member comprising an electroconductive support and a photosensitive layer on said support,
   $R_2$ is an aryl group; and
   $R_3$ and $R_{3'}$ are each an alkyl group, an alkenyl group, an aralkyl group or an aryl group.

2. The electrophotographic photosensitive member according to claim 1, wherein the photosensitive layer comprises a carrier generating layer and a carrier transporting layer, and said carrier generating layer contains the bisazo compound.

3. The electrophotographic photosensitive member according to claim 1, wherein in the photosensitive member an intermediate layer is positioned between the photosensitive layer and the support.

4. The electrophotographic photosensitive member according to claim 1, wherein A in the bisazo compound is:

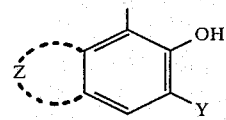

wherein Y and Z have the same meanings as defined in claim 1.

5. The electrophotographic photosensitive member according to claim 1, wherein A in the bisazo compound is:

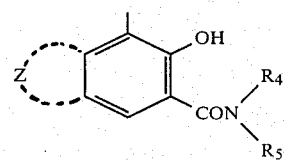

wherein Z has the same meaning as defined in claim 1; $R_4$ is a hydrogen atom, a lower alkyl group having 1 to 4 carbon atoms, a lower alkenyl group, an aralkyl group or a phenyl group; and $R_5$ is a hydrogen atom, a lower alkyl group having 1 to 4 carbon atoms, a lower alkenyl group, an aralkyl group, an aromatic hydrocarbon ring or an aromatic heterocyclic group.

6. The electrophotographic photosensitive member according to claim 1, wherein A in the bisazo compound is:

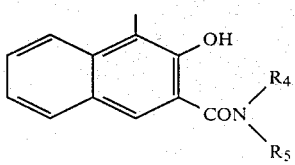

wherein $R_4$ is a hydrogen atom and $R_5$ is a hydrogen atom, a lower alkyl group having 1 to 4 carbon atoms, a lower alkenyl group, an aralkyl group, an aromatic hydrocarbon ring or an aromatic heterocyclic ring.

7. The electrographic photosensitive member according to claim 1, wherein A in the bisazo compound is:

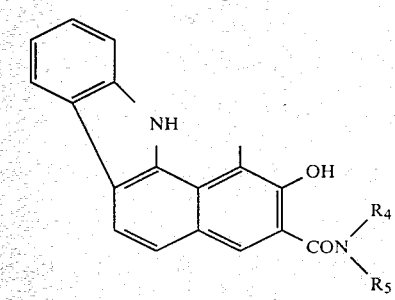

wherein R₄ is a hydrogen atom and R₅ is a hydrogen atom, a lower alkyl group having 1 to 4 carbon atoms, a lower alkenyl group, an aralkyl group, an aromatic hydrocarbon ring or an aromatic heterocyclic ring.

8. The electrophotographic photosensitive member according to claim 1, wherein the electrophotographic photosensitive layer is used for an electrophotographic process by use of a long wavelength of 700-900 nm as the light source, wherein A in the bisazo compound is wherein R₄ is a hydrogen atom an R₅ is a hydrogen atom, a lower alkyl group having 1 to 4 carbon atoms, a lower alkenyl group, an aralkyl group, an aromatic hydrocarbon ring or an aromatic heterocyclic ring.

9. The electrophotographic photosensitive member according to claim 3, wherein the photosensitive layer comprises a carrier generating layer and a carrier transporting layer, and said carrier generating layer contains the bisazo compound.

10. The electrophotographic photosensitive member according to claim 9, wherein said bisazo compound is

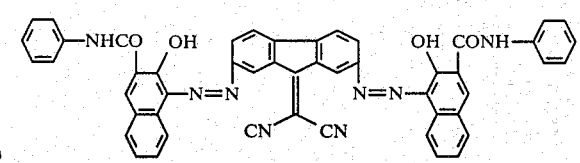

11. The electrophotographic photosensitive member according to claim 9, wherein said biazo compound is

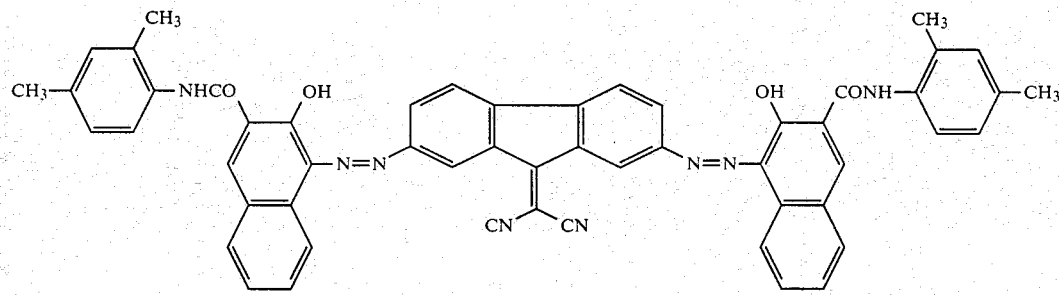

12. The electrophotographic photosensitive member according to claim 9, wherein said bisazo compound is

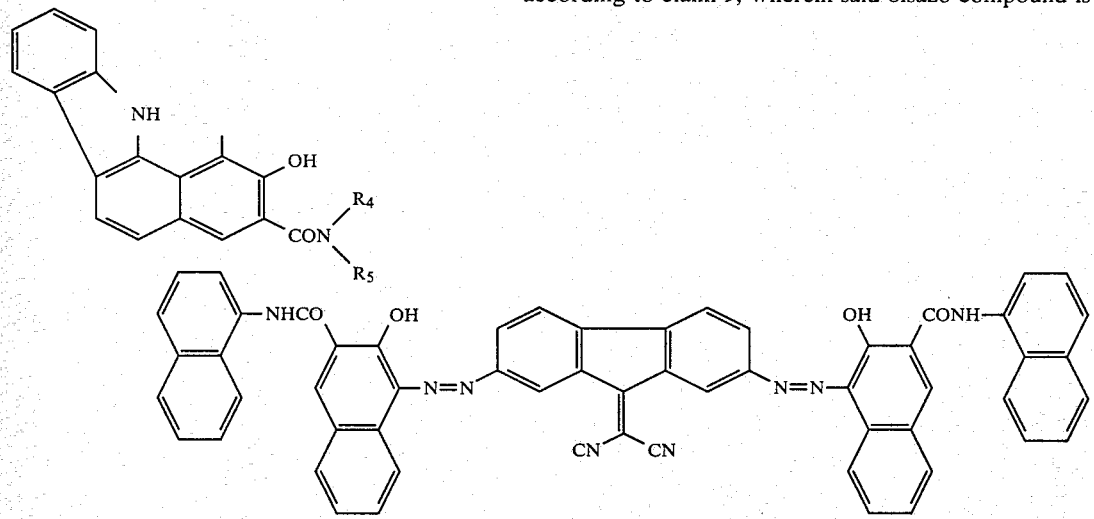

13. The electrophotographic photosensitive member according to claim 9, wherein said bisazo compound is

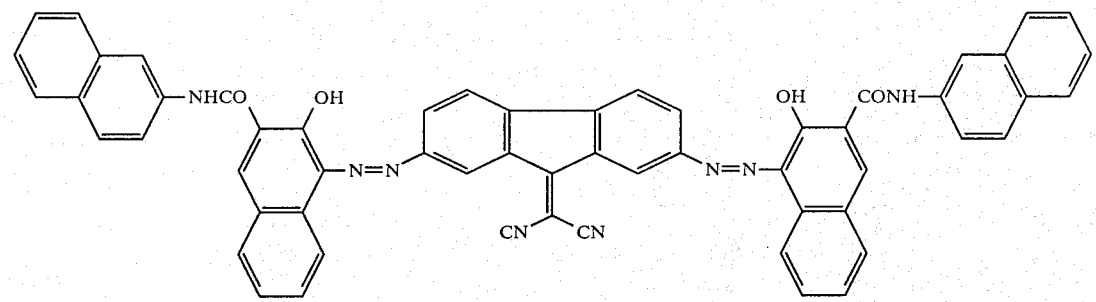

14. The electrophotographic photosensitive member according to claim 9, wherein said bisazo compound is

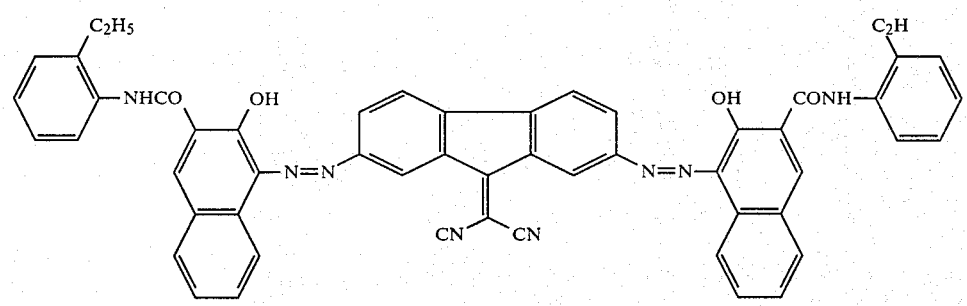

15. The electrophotographic photosensitive member according to claim 9, wherein said bisazo compound is

16. The electrophotographic photosensitive member according to claim 9, wherein said bisazo compound is

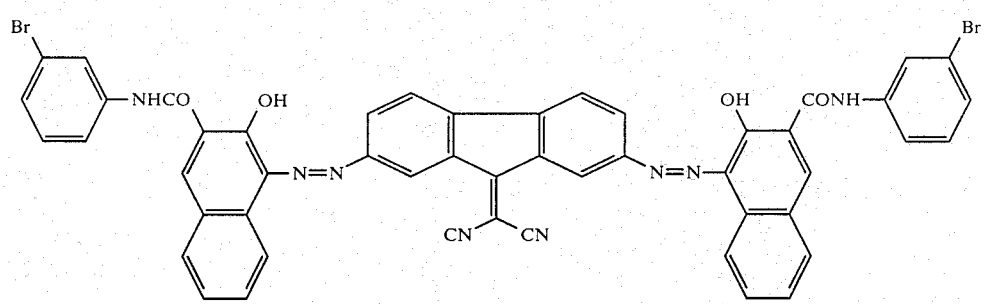

17. The electrophotographic photosensitive member according to claim 9, wherein said bisazo compound is

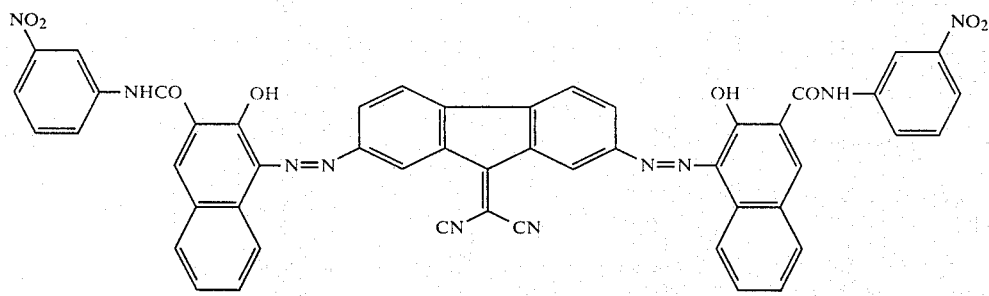

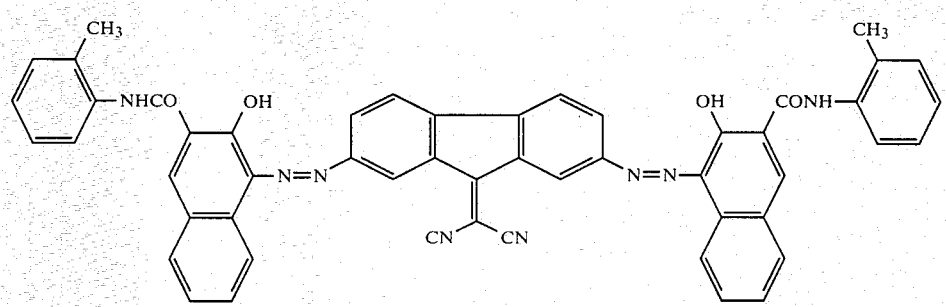

18. The electrophotographic photosensitive member according to claim 9, wherein said bisazo compound is 20. The electrophotographic photosensitive member according to claim 9, wherein said bisazo compound is

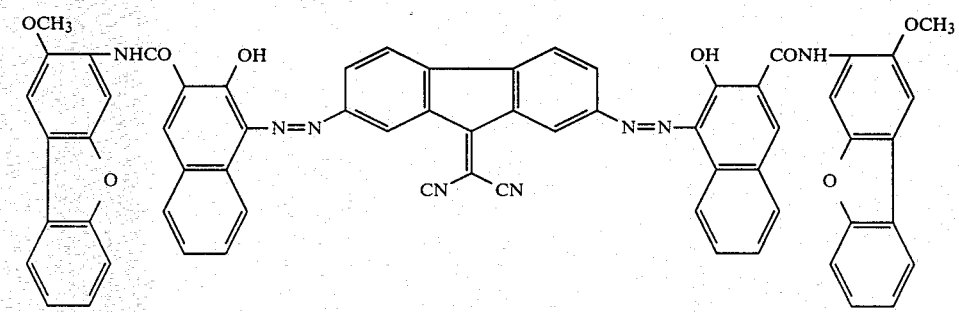

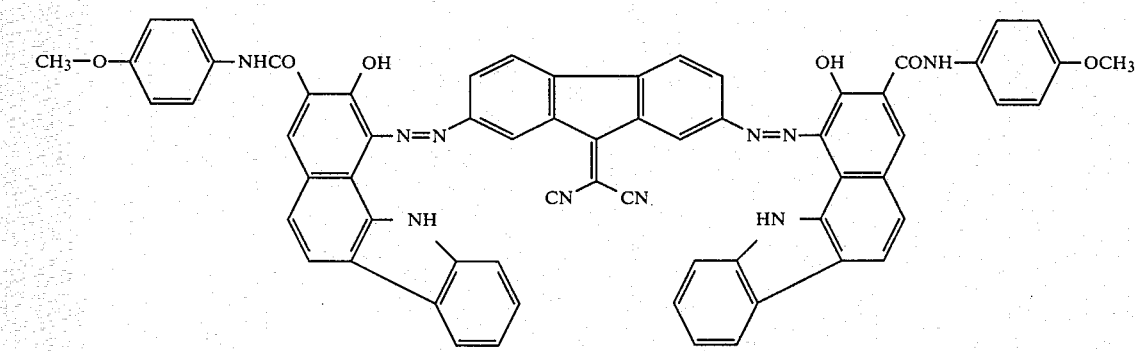

19. The electrophotographic photosensitive member according to claim 9, wherein said bisazo compound is 21. The electrophotographic photosensitive member according to claim 9, wherein said bisazo compound is

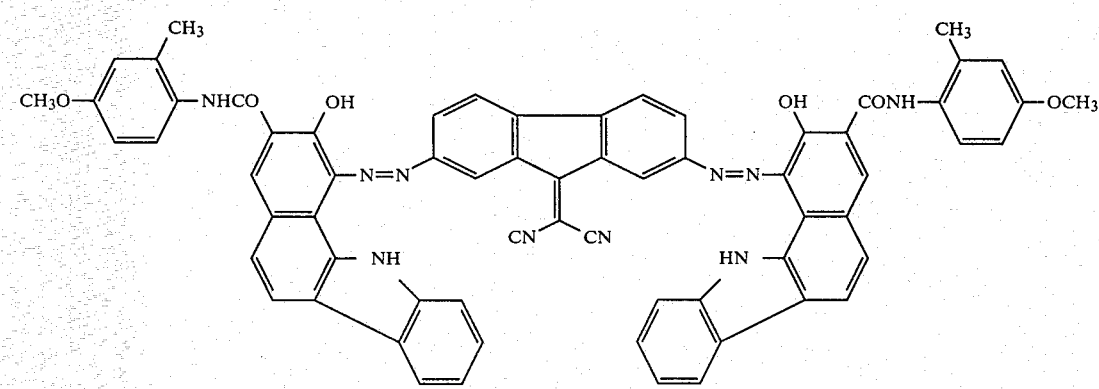

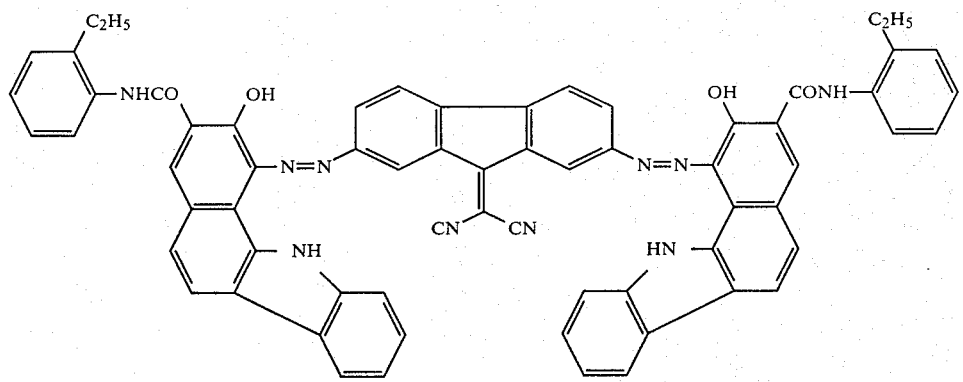
22. The electrophotographic photosensitive member according to claim 9, wherein said bisazo compound is
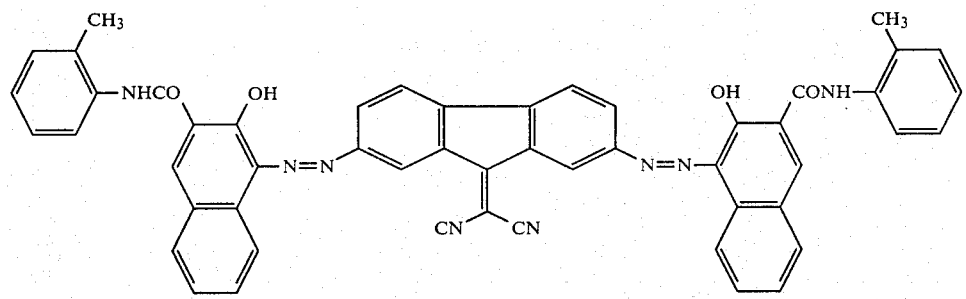
according to claim 9, wherein said bisazo compound is
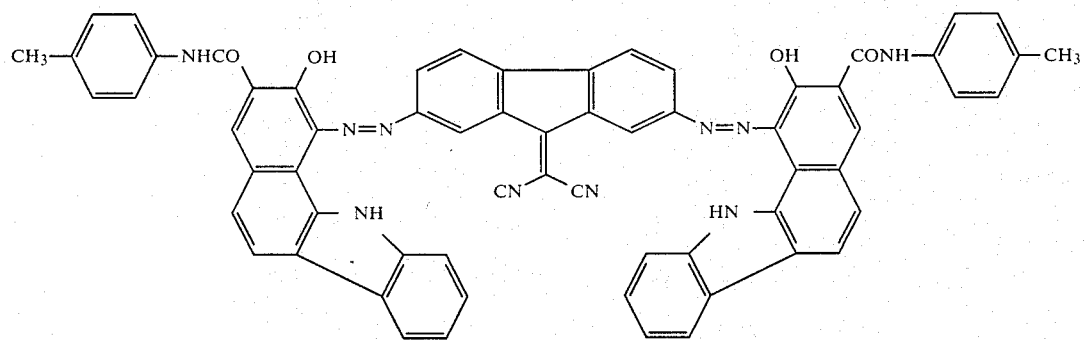
23. The electrophotographic photosensitive member
* * * * *